United States Patent [19]

Ogasa et al.

[11] Patent Number: 4,595,572

[45] Date of Patent: Jun. 17, 1986

[54] RECOVERING GOLD AND SILVER FROM AN AQUEOUS SOLUTION CONTAINING CYANIC COMPOUNDS OF GOLD AND SILVER

[75] Inventors: Tadayoshi Ogasa, Ichikawa; Fumio Kondo, Kashiwa, both of Japan

[73] Assignee: Sumitomo Metal Mining Company Limited, Tokyo, Japan

[21] Appl. No.: 675,463

[22] Filed: Nov. 28, 1984

Related U.S. Application Data

[63] Continuation-in-part of Ser. No. 547,345, Oct. 31, 1983, abandoned.

[30] Foreign Application Priority Data

Sep. 10, 1983 [JP] Japan .................................. 58-167323

[51] Int. Cl.$^4$ ............................................. C22B 11/08
[52] U.S. Cl. .................................... 423/25; 75/118 R; 75/106; 75/108; 423/29
[58] Field of Search ........................ 423/25, 29, 30, 31; 75/105, 106, 107, 118 R

[56] References Cited

U.S. PATENT DOCUMENTS 3,970,737  7/1976  Davidson .............................. 423/25
4,289,532  9/1981  Matson et al. ....................... 423/25

FOREIGN PATENT DOCUMENTS 1125033   6/1982  Canada ................................. 75/106
10367    11/1979  European Pat. Off. .............. 423/29
18501     2/1980  Japan .................................... 423/27

Primary Examiner—John Doll
Assistant Examiner—Jeffrey E. Russel
Attorney, Agent, or Firm—Watson, Cole, Grindle & Watson

[57] ABSTRACT

A method of recovering gold and silver efficiently and almost completely from an aqueous solution containing cyanic compounds of gold and silver and which comprises adjusting the pH of the aqueous solution containing cyanic compounds of gold and silver to 6.0 or less, preferably to pH 3.0–5.0, by adding mineral acid, such as sulfuric acid or hydrochloric acid, preferably together with a small amount of active carbon, and subsequently passing the aqueous solution through an active carbon bed, preferably pretreated with mineral acid.

7 Claims, No Drawings

RECOVERING GOLD AND SILVER FROM AN AQUEOUS SOLUTION CONTAINING CYANIC COMPOUNDS OF GOLD AND SILVER

This application is a continuation-in-part of application Ser. No. 547,345, filed Oct. 31, 1983, now abandoned.

BACKGROUND OF THE INVENTION

1. Field of the Invention

This invention relates to the recovery of gold and silver from an aqueous solution containing cyanic compounds of valuable metals. More specifically, it relates to a method of separating and recovering gold and silver from an aqueous solution containing free cyan and also containing cyanic compounds of valuable metals including small amounts of gold and silver.

2. Description of the Prior Arts

Heretofore, it has been proposed to recover gold and silver from an aqueous solution containing gold and silver as cyanic compounds, for example, by contacting the aqueous solution with an excess of oxygen and simultaneously irradiating it with radiation at a wavelength of 20-600 nm to precipitate gold and silver (Japanese Patent Publication No. 31240/1983, published on July 5, 1983); or by passing the aqueous solution through an ion exchange resin bed to adsorb gold, silver, etc., (Japanese Patent Publication No. 15190/1983, published on Mar. 24, 1983) and so forth.

However, the former method was such that the temperature was preferably a high temperature such as 90°-100° C. and the aqueous solution was exposed as a thin layer or as fine droplets to oxygen and radiation of a wavelength of 20-600 nm for 40 hours or longer, preferably for 100 hours or longer (Japanese Patent Application Laid-Open No. 51068/1975, laid-open on May 7, 1975), and thus had the disadvantage of requiring the use of large equipment. In addition, this method was inefficient. The latter method was also disadvantageous in that the ion exchange resin after treatment could not be regenerated and thus the cost was increased, and in addition it had the additional drawbacks of weak adsorptivity, a small liquid volume which could be treated and a great difficulty in reducing the content of the resultant solution after treatment to 0.1 mg/l or less of Au.

Against this background the present inventors proposed in Japanese Patent Publication No. 22530/1983 an improved method of recovering gold and silver from an aqueous solution containing cyanic compounds of valuable metals. According to this method a hypochlorite is added to the aqueous solution until its oxidation-reduction potential indicates +350 mV or higher, mineral acid together with a small amount of active carbon is added to this aqueous solution to make the pH 5.0 or less, the resulting precipitates are separated, and the remaining aqueous solution is passed through an active carbon bed which has been pretreated with mineral acid, thereby adsorbing the valuable substances to the active carbon. This method has enabled the recovery of almost all the gold, silver and other metals from the aqueous solution in which a large amount of alkali cyanide (hereinafter referred to as free cyan) and high concentrations of cyanic compounds of Au, Ag, Cu, Ni, Co, Zn, etc., are co-present.

SUMMARY OF THE INVENTION

The present inventors have now succeeded in adsorbing Au and Ag to the active carbon preferentially and almost completely by adjusting the pH of an aqueous solution containing a certain amount of free cyan and small amounts of cyanic compounds of Au, Ag, Cu, Ni, Co, Zn, Fe, etc., and subsequently passing the aqueous solution through an active carbon bed under appropriate conditions.

In accordance with the present invention a method of adsorbing and recovering gold and silver comprises adjusting the pH of an aqueous solution containing between 3 and 50 mg/l of sodium cyanide and/or potassium cyanide (hereinafter called free cyan) and cyanic compounds of valuable metals including small amounts of gold and silver, such as a plating waste liquor, a plating washed water, an ion exchange resin eluate, etc., containing 10-200 mg of total cyan and about 0.5-30 mg of Au, about 1-30 mg of Ag and about 5-20 mg each of Cu, Ni, Co, Zn, Fe, etc., per liter of the solution, by adding a mineral acid, such as dilute sulfuric acid or hydrochloric acid, preferably together with a small amount of active carbon, to achieve a pH of 6.0 or less, preferably a pH of 3-5, and subsequently passing the solution through an active carbon bed having a particle size of about 0.3-3 mm and which has preferably been pretreated with mineral acid, at a space velocity of 5 to 20 hrs$^{-1}$.

The aqueous solution to be treated is preferably a plating waste liquor, etc., containing very small amounts of gold and silver and about 10-30 mg/l of free cyan.

DETAILED DESCRIPTION OF THE INVENTION

As a first step, mineral acid is added to the aqueous solution to adjust the pH to 6.0 or less; since about 10% of the free cyan evaporates, it is preferred to wash the exhaust gas with a dilute alkali solution. The reason for adjusting the pH to 6.0 or less, preferably to pH 3-5, is that if the pH is above the upper limit, the adsorption of gold and silver is poor, whereas even at an extremely low pH, the effect of this adsorption is not particularly increased. The addition of a small amount of active carbon promotes growing of the fine precipitates, but this addition of active carbon can be omitted without much inconvenience.

Decomposition of free cyan in the aqueous solution usually does not occur in the first step. However, in case of an extremely large amount of free cyan contained in the aqueous solution, i.e., in excess of 50 mg/l, some free cyan must be removed by the conventional method to be within the range defined by the present invention, i.e, since such a large amount of free cyan will cause the yields of gold and silver to be reduced. On the other hand, if the aqueous solution contains an extremely small amount of free cyan, i.e., less than 3 mg/l, the impurities such as copper, nickel, etc., will be adsorbed together with the gold and silver and thereby will contaminate the gold and silver. Although it is essential as a second step to pass the aqueous solution containing free cyan of a predetermined concentration therein through the active carbon bed in order to preferentially adsorb gold and silver to the active carbon, it is not yet understood why gold and silver are preferentially adsorbed to the active carbon under the above-described conditions.

Research has shown, however, that the degree of adsorption to active carbon of ionized metals of cyanic complex salts of the metals in the presence of free cyan has a predetermined order which is different from the order of the ionization (or dissociation) constants of the cyanic complex salts of the metals, and in the case of an ordinary plating waste liquor, Au is first followed by Ag and then Zn, Cu, Ni, Co and Fe, in that order.

Owing to this phenomenon, it is possible, under appropriate conditions, to efficiently recover Au and Ag having only extremely low contents of impurities.

The active carbon used as an adsorbent for metals does not need to be particularly specific and a commercially available active carbon will suffice for this purpose, the average particle size being preferably 0.3-3 mm, more preferably 1-3 mm. If the active carbon is a fine powder, plugging often occurs, whereas if the particles are coarse, adsorptivity of gold and silver is weak. Further, the reason why the active carbon is pretreated with mineral acid is based on the discovery that the cyanic compounds of gold and silver in aqueous solution are strongly adsorbed to the mineral acid-treated active carbon.

The space velocity at which the aqueous solution is passed through the active carbon bed is preferably in the range of 5 to 20 $hrs^{-1}$. If the space velocity exceeds this range, the actual yields of gold and silver are reduced as demonstrated in the examples described later, whereas if the space velocity is less than the above range, no improvement in adsorption of gold and silver can be obtained.

The invention is applicable not only to ordinary plating waste liquors but also to those having higher concentrations or even an aqueous solution having only an extremely low gold and silver contents which have usually been discharged, and can reliably and efficiently recover gold and silver in a form having a very low impurity content.

Moreover, valuable metals other than gold and silver can be recovered easily by decomposing the free cyan and subsequently passing through two or three beds of active carbon. Instead of passing the aqueous solution through an active carbon bed, it is possible to add active carbon to the aqueous solution and subsequently separate the active carbon. The active carbon adsorbate may be then roasted prior to treatment in a cupellation furnace in a conventional manner. Waste gases generated during roasting and treatment in the cuppellation furnace are desirably treated with a dilute alkali solution. Further, the treated liquor in the second step may be discharged after decomposing the cyan by the known hypochlorite method.

Gold and silver may be efficiently recovered easily and almost completely in a form having only extremely low level of impurities, from an aqueous solution containing cyanic compounds of gold, silver, copper, zinc, etc., as well as free cyan. Where the aqueous solution contains high concentrations of gold, silver, etc., the use of the method described in the prior art as Japanese Patent Publication No. 22530/1983 is recommendable. The equipment for recovering the valuable metals in the above both methods may use similar type.

This invention is more particularly illustrated by the following examples.

EXAMPLE 1

100 liter samples of a plating waste liquor (original solution) containing 10.2 mg/l of free cyan and having the composition set forth in Table 1 was added dilute sulfuric acid, obtained by diluting concentrated sulfuric acid 2-fold with water, to adjust the pH to between 3.0 and 6.0. Each 30 g of separate samples of Active Carbon A (trade name: Filtrasorb, 400 manufactured by Calgon Corp.), Active Carbon B (trade name: BM-WA, manufactured by Mitsui Pharmaceuticals Inc.) and Active Carbon C (trade name: Shirasagi F, manufactured by Takeda Chemical Industries Ltd.) having a particle size of 2-3 mm were each treated with about 100 ml of dilute sulfuric acid at a pH 3.0 and washed with water respectively. The aqueous solutions obtained above were then passed at a space velocity of 10 $hrs^{-1}$ through columns of 30 mm inner diameter packed with 30 g of one of the above active carbons.

The results are shown in Table 1.

TABLE 1

| | | | | Original Soln. | | | | | | | | |
|---|---|---|---|---|---|---|---|---|---|---|---|---|
| No. | Active Carbon | pH at Start | Treated Liquor | Au (mg/l) 4.5 | Ag (mg/l) 28.6 | Cu (mg/l) 10.8 | Ni (mg/l) 16.1 | Co (mg/l) 15.5 | Zn (mg/l) 15.3 | Fe (mg/l) 18.1 | Total CN (mg/l) 75.6 | pH 9.5 |
| 1 | A | 3.0 | First Liquor | <0.01 | 0.10 | 3.6 | 8.9 | 13.7 | 5.5 | 17.8 | 8.8 | 3.1 |
| 2 | B | 3.0 | First Liquor | 0.02 | 0.15 | 4.2 | 9.0 | 15.2 | 5.2 | 17.7 | 8.9 | 3.1 |
| 3 | " | 3.1 | Second Liquor*1 | <0.01 | 0.02 | 0.3 | 6.3 | 12.2 | 0.2 | 14.2 | 6.2 | 4.5 |
| 4 | " | 3.0*2 | First Liquor | 0.01 | 0.05 | — | — | — | — | — | — | — |
| 5 | " | 5.0 | First Liquor | 0.02 | 0.16 | 4.5 | 9.5 | 15.3 | 5.3 | 17.8 | 9.0 | 5.5 |
| 6 | " | 6.0 | First Liquor | 0.08 | 0.52 | 5.7 | 12.5 | 15.5 | 10.8 | 18.0 | 20.1 | 6.6 |
| 7 | C | 3.0 | First Liquor | 0.02 | 0.18 | 3.8 | 10.1 | 15.3 | 6.0 | 17.7 | 9.1 | 3.1 |
| 8 | " | 9.5 | First Liquor | 0.50 | 0.80 | — | — | — | — | — | — | — |

Notes
*1 The concentration of the treated liquor obtaining by repeatedly using the column packed with the active carbon.
*2 That obtained by adding 10 g of Active Carbon B on adjusting the pH by the addition of dilute sulfuric acid to the original solution.

As can be seen from Table 1, in Experiment No. 6, the pH value was high and thus the percentages of Au and Ag adsorbed were somewhat poor. In Experiment No. 4 in which the active carbon was added on the pH adjustment, and Experiment No. 3 in which the column treatment was repeated, particularly satisfactory results were obtained. On the contrary, in Experiment No. 8 in which the pH adjustment was omitted, both Au and Ag concentrations in the treated liquor were high, thus showing very poor results.

EXAMPLE 2

Fifty liter samples of a water-washed waste plating liquor each containing 3 mg/l of free cyan and having the composition set forth in Table 2 were treated similarly as in Example 1, except that 10 g of Active Carbon B was packed in each column of 20 mm inner diameter, the space velocities were 5, 10, 20 and 30 hrs$^{-1}$ and the pH was adjusted to 4.0.

The results are shown in Table 2.

TABLE 2

| | | | | Original Soln. | | | | | | | | |
|---|---|---|---|---|---|---|---|---|---|---|---|---|
| No. | pH at Start | Treated Liquor | Space velocity | Au (mg/l) 2.2 | Ag (mg/l) 5.8 | Cu (mg/l) 3.2 | Ni (mg/l) 4.5 | Co (mg/l) 4.2 | Zn (mg/l) 4.4 | Fe (mg/l) 5.0 | Total CN (mg/l) 8.8 | pH 9.0 |
| 9 | 4.0 | First Liquor | 5 | 0.01 | 0.08 | 1.2 | 2.7 | 4.0 | 1.5 | 4.9 | 6.1 | 4.3 |
| 10 | " | First Liquor | 10 | 0.02 | 0.10 | 1.3 | 3.1 | 4.0 | 1.5 | 4.9 | 6.1 | 4.3 |
| 11 | " | First Liquor | 20 | 0.05 | 0.16 | 1.3 | 3.2 | 4.1 | 1.6 | 4.9 | 6.3 | 4.2 |
| 12 | " | First Liquor | 30 | 0.15 | 0.55 | 2.0 | 3.8 | 4.2 | 1.9 | 5.0 | 6.5 | 4.1 |

As can be seen from Table 2, all experiments yielded satisfactory results with the exception of Experiment No. 12 in which the space velocity was 30 hrs$^{-1}$. Under these conditions both Au and Ag were poorly adsorbed.

EXAMPLE 3

A waste plating liquor was treated with an ion exchange resin and a part of the adsorbed metals were eluted with an alkali hydroxide and water to obtain an eluate set forth in Table 3. Fifty liters thereof was treated in manner similar to that described in Example 2 except that the space velocity was 10 hrs$^{-1}$ and the pH was 3.0

The results are shown in Table 3.

TABLE 3

| | | | Original Soln. | | |
|---|---|---|---|---|---|
| No. | pH at Start | Treated Liquor | Au (mg/l) 0.33 | Ag (mg/l) 2.1 | pH 10.0 |
| 13 | 3.0 | First Liquor | <0.01 | 0.06 | 3.1 |

Table 3 illustrates that the results obtained were similar to those obtained in Example 1, which were adequate for practical uses.

EXAMPLE 4

Concentrated hydrochloric acid was added to 20 m$^3$ of the waste plating liquor (original solution) used in Example 1 to adjust the pH to 5.0, and using a device known by the Trade Name: GOLD ACE Model 150B (manufactured by Sumitomo Metal Mining Co. Ltd.) having two columns, each having an inner diameter of 1200 mm and a height of 2500 mm, arranged in series and which were each packed with Active Carbon B pretreated with dilute hydrochloric acid as described in Example 1 to a height of 1,800 mm (amount of adsorbent used: 1,000 kg/column; capacity of gold adsorbed: about 20 kg/column). The aqueous solution was passed through the device at a space velocity of 5 hrs$^{-1}$, and the final liquor was quantitatively analysed by atomic adsorption spectroscopy.

The results are shown in Table 4.

TABLE 4

| | | Original Soln. | | | | | | | |
|---|---|---|---|---|---|---|---|---|---|
| No. | Treated Liquor | Au (mg/l) 4.5 | Ag (mg/l) 28.6 | Cu (mg/l) 10.8 | Ni (mg/l) 16.1 | Co (mg/l) 15.5 | Zn (mg/l) 15.3 | Fe (mg/l) 18.1 | Total (mg/l) 75.6 | pH 9.5 |
| 14 | First Liquor | <0.01 | 0.01 | 0.2 | 5.5 | 12.0 | 0.2 | 13.0 | 5.8 | 5.6 |

These results are closely similar to those obtained in Experiment No. 3 (Table 1). There was no problem with the recovery of Au and Ag, and the concentrations of the other impurities were slightly reduced.

In order to avoid as much as possible the incorporation of impurities into the desired Au and Ag, it is preferred to increase the space velocity, but there is a point at which the yields of Au and Ag are given priority for reasons of economy. Instead of the device used in Example 4, GOLD ACE Model 5A, 20A and 80B (same manufacturer) can be also used and recovered gold and silver efficiently.

EXAMPLE 5

Similar treatment to as in Example 1 was performed except that the concentration of free cyan was fixed at a predetermined value, the pH was adjusted to 3.0, the space velocity was 5 hrs$^{-1}$ and Active Carbon A was used.

The results are shown in Table 5.

TABLE 5

| No. | Treated Liquor | Free-CN (mg/l) | Original Soln. Au (mg/l) 22.0 | Ag (mg/l) 27.8 | Cu (mg/l) 20.0 | Ni (mg/l) 16.0 | Co (mg/l) 15.0 | Zn (mg/l) 15.8 | Fe (mg/l) 15.8 |
| --- | --- | --- | --- | --- | --- | --- | --- | --- | --- |
| 15 | First Liqour | 0 | <0.01 | 0.03 | 0.05 | 0.10 | 0.05 | 0.04 | 13.5 |
| 16 | " | 5 | <0.01 | 0.06 | 5.8 | 10.1 | 10.2 | 4.3 | 15.6 |
| 17 | " | 10 | <0.01 | 0.08 | 6.0 | 8.9 | 13.7 | 5.5 | 15.7 |
| 18 | " | 50 | 0.03 | 0.12 | 11.5 | 12.0 | 14.5 | 8.0 | 15.8 |
| 19 | " | 100 | 0.15 | 0.52 | 4.5 | 3.3 | 3.5 | 5.4 | 15.8 |

As can be seen from Table 5, in Experiment No. 15 wherein no free cyan is contained the impurities were adsorbed in a large amount.

In Experiment No. 19 the impurities were adsorbed, but the adsorptivity of gold and silver was considerably weaked. All experiments other than Experiment No. 15 and No. 19 yielded satisfactory results wherein gold and silver were preferentially adsorbed and the adsorption of the impurities was considerably restricted. According to the present invention, the strongest adsorptivity is observed at pH 3.0 (see Table 1).

We claim:

1. A method of preferentially recovering gold and silver from an aqueous solution containing cyanic compounds of gold, silver, and metals selected from the group consisting of copper, nickel, cobalt, zinc and iron, said solution containing between about 0.5 to 30 mg/l of gold, about 0.5 to 30 mg/l of silver, about 5 to 20 mg/l of the metals selected from the group consisting of copper, nickel, cobalt, zinc and iron, and 5 to 50 mg/l of free cyan selected from the group consisting of sodium cyanide and potassium cyanide, said method comprising the steps of (a) adding a mineral acid to said aqueous solution to reduce its pH to 6.0 or less, and (b) passing said acidified aqueous solution through a bed of active carbon.

2. A method according to claim 1, wherein in step (a) a small amount of active carbon is added to said aqueous solution together with said mineral acid.

3. A method according to claim 1, wherein the mineral acid added in step (a) is selected from the group consisting of sulfuric acid and hydrochloric acid.

4. A method according to claim 1, including the step of pretreating the bed of active carbon with mineral acid before passing the acidified aqueous solution therethrough in step (b).

5. A method according to claim 1, wherein the bed of active carbon used in step (b) is composed of active carbon particles having sizes of 0.3 to 3 mm.

6. A method according to claim 1, wherein in step (b) the acidified aqueous solution is passed through the bed of active carbon at a space velocity of 5 to 20 $hrs^{-1}$.

7. A method according to claim 1, wherein in step (a) the pH is reduced to between 3 and 5.

* * * * *